United States Patent [19]

Ogawa et al.

[11] Patent Number: 4,681,074
[45] Date of Patent: Jul. 21, 1987

[54] STRUCTURE OF DIVIDED COMBUSTION CHAMBER FOR INTERNAL COMBUSTION ENGINE

[75] Inventors: Yutaka Ogawa; Takayuki Ogasawara; Shigeru Hanzawa, all of Nagoya, Japan

[73] Assignee: NGK Insulators, Ltd., Japan

[21] Appl. No.: 876,419

[22] Filed: Jun. 20, 1986

[30] Foreign Application Priority Data

Jun. 24, 1985 [JP] Japan .............................. 60-95515[U]

[51] Int. Cl.⁴ ............................................. F02B 19/16
[52] U.S. Cl. .................................... 123/271; 123/270
[58] Field of Search ................ 123/270, 271, 668, 669

[56] References Cited

U.S. PATENT DOCUMENTS 4,616,611 10/1986 Ogawa et al. ....................... 123/270

FOREIGN PATENT DOCUMENTS 3536866 4/1986 Fed. Rep. of Germany ...... 123/270
64116 5/1980 Japan ................................ 123/270
162721 9/1983 Japan ................................ 123/270
1534761 12/1978 United Kingdom .

OTHER PUBLICATIONS

Japenses Patent Abstract; vol. 4, No. 139, (M-34) [621]Sep. 30, 1980, "Construction of Engine Combustion Chamber".
Japanese Patent Abstract; vol. 10, No. 66, (M-461) [2123] Mar. 15, 1986, "Sub-Chamber for Internal-Combustion Engine".

Primary Examiner—Tony M. Argenbright
Attorney, Agent, or Firm—Parkhurst & Oliff

[57] ABSTRACT

A structure defining a divided combustion chamber of an internal combustion engine, including an upper ceramic member and a lower ceramic member having a passage which abut on each other at an interface to form therein the divided combustion chamber such that the chamber communicates with a main combustion chamber through a passage formed in the lower ceramic member. The upper and lower ceramics members have cutouts formed respectively in their outer surfaces so as to cooperate to constitute at least one external recess which extends across the interface. An expansion member is fitted in each external recess, and has a larger coefficient of thermal expansion than the upper and lower ceramic members, whereby the expansion member keeps the upper and lower ceramic members spaced apart from each other by a predetermined amount at their interface while the engine is operated.

21 Claims, 11 Drawing Figures

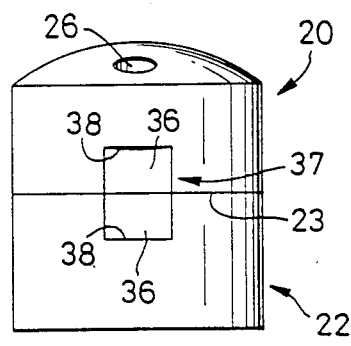
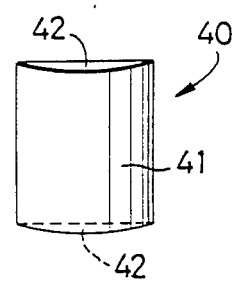
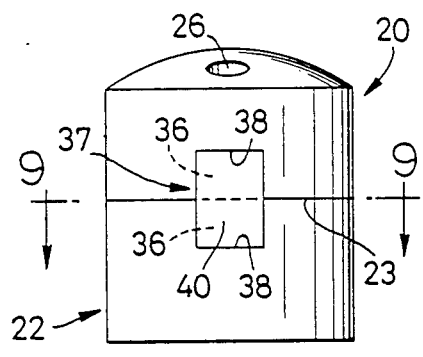
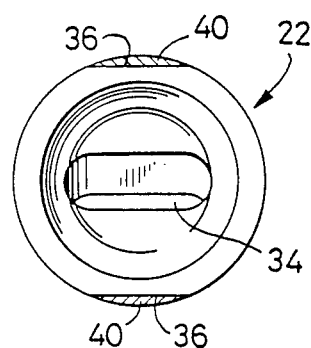
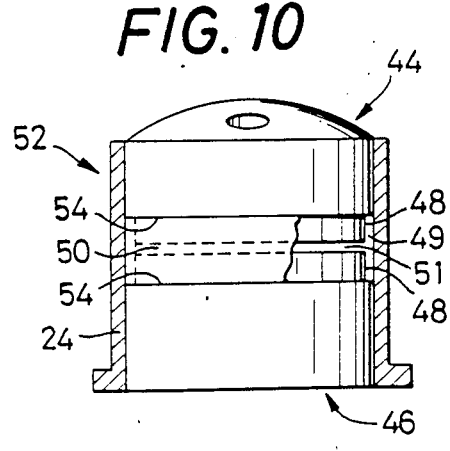
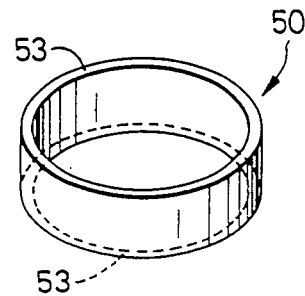

STRUCTURE OF DIVIDED COMBUSTION CHAMBER FOR INTERNAL COMBUSTION ENGINE

BACKGROUND OF THE INVENTION

1. Field of Art

The present invention relates generally to a ceramic structure defining a divided combustion chamber of an internal combustion engine, ad more particularly to an improved structure consisting of a plurality of ceramic members which cooperate to define a divided combustion chamber of an internal combustion engine for automotive vehicles.

2. Related Art Statement

There have been made heretofore a number of attempts to use a ceramic material for a divided combustion chamber of an internal combustion engine, such as a swirl or pre-combustion chamber of a Diesel engine. For example, the use of various ceramic materials having excellent heat resistance and high strength at an elevated temperature, such as silicon carbide or nitride, has been proposed for improving the durability of the cup structure of the swirl chamber which is formed with a gas passage communicating with the main combustion chamber of the Diesel engine. In the recent years, it has been proposed to form the entire structure of such a swirl chamber of a ceramic material, with a view to ensuring improved fuel economy or thermal efficiency of the engine, by utilizing the heat insulating properties of the ceramic material, which contribute to maintaining a higher temperature of the combustion gas within the swirl chamber.

In the case where a divided combustion chamber is wholly formed of a ceramic material, like the swirl chamber indicated above, the structure defining the chamber generally consists of a plurality of separate ceramic members which are assembled so as to cooperate to form the chamber therein. Usually, the assembly of the ceramic members defining therein the divided combustion chamber is retained in the cylinder head of the engine, by the inner wall of the cylinder head if the assembly is directly received in a recess formed in the cylinder head, or alternatively by an external metallic ring or sleeve which is disposed in the recess and is fitted on the outer surface of the assembly.

Problem Solved by the Invention

In the structure of the divided combustion chamber of the type discussed above wherein the structure consists of two or more ceramic members, the retention force for holding the assembly of the separate ceramic members is inevitably reduced when the temperature within the divided chamber is elevated due to operation of the internal combustion engine, since the assembly of the ceramic members is held together in the cylinder head, by means of a shrink fit of the inner wall of the cylinder head or the external metallic ring or sleeve on the outer surface of the ceramic assembly, by utilizing a difference in thermal expansion coefficient between the ceramic members and the cylinder wall or metallic ring or sleeve shrink-fitted on the ceramic assembly. Accordingly, the ceramic members retained in the cylinder head with a reduced force during an operation of the engine tend to have slight oscillating movements relative to each other due to explosion of the fuel and vibrations of the engine, whereby the ceramic members unavoidably hit or butt each other at their abutting or interface surfaces. As a result, the abutting surfaces of the ceramic members may be subject to chipping or cracking. Thus, the ceramic structure of the divided combustion chamber suffers relatively low operating reliability.

Japanese Patent Application which was laid open in 1985 under Publication No. 60-21525 discloses a technique in which a metallic ring is fitted on the outer surface of an assembly of an upper ceramic member and a lower ceramic member, such that the metallic ring holds the separate upper and lower ceramic members in a slightly spaced-apart relation with each other at their interface, so as to avoid butting movements of the two ceramic members. However, since the retention force of the metallic ring exerted on the ceramic assembly is reduced as the temperature of the ceramic assembly is raised, the metallic ring cannot maintain the originally provided air gap between the mating surfaces of the upper and lower ceramic members. Therefore, this proposed arrangement is not satisfactory to completely protect the ceramic members against chipping or cracking at their interface due to the oscillating movements of the ceramic members.

SUMMARY OF THE INVENTION

It is accordingly an object of the present invention to provide a structure which consists of a plurality of separate ceramic members defining a divided combustion chamber of an internal combustion engine, and which is protected against damages at the interface of vertically adjacent ceramic members due to butting movements of the two ceramic members during operation of the engine at the elevated operating temperature.

According to the present invention, there is provided a structure defining a divided combustion chamber of an interanl combustion engine, comprising an upper ceramic member, and a lower ceramic member having a transfer passage which communicates with a main combustion chamber of the engine, the upper and lower ceramic members meeting with each other at an interface to form therein the divided combustion chamber such that the divided combustion chamber communicates with the main combustion chamber through the transfer passage, characterized in that the upper and lower ceramic members have cutouts formed respectively in the outer surfaces, the cutouts cooperating to constitute at least one external recess which extends across the interface so as to bridge the adjacent portions of the upper and lower ceramic members, and in that an expansion member is fitted in each of the at least one external recess. The expansion member is formed of a heat-resistant material which has a larger coefficient of thermal expansion than the ceramic materials of the upper and lower ceramic members. The expansion member thermally expands relative to the upper and lower ceramic members at an operating temperature of the engine, and thereby keeping the upper and lower ceramic members spaced apart from each other, with a predetermined amount of air gap left at the interface of the two ceramic members while the engine is operated at the elevated temperature.

In the structure constructed according to the present invention as described above, the upper and lower ceramic members are moved a small distance away from each other by thermal expansion of the expansion member received in each external recess, as the temperature in the divided combustion chamber is elevated after the start of the internal combustion engine, whereby the predetermined air gap is maintained between the mating surfaces of the two separate ceramic members. The existence of this air gap prevents otherwise possible mutual butting or hitting of the two ceramic members and consequent chipping or cracking at their interface even when the ceramic members have oscillating movements due to explosion of the fuel or vibration of the engine. Further, for a short time after the start of the engine, that is, while the engine is still in a cold state, the ceramic members are firmly retained together with a relatively large force by a metallic ring or by the inner wall of the cylinder head of the engine, and therefore these upper and lower ceramic members are prevented from oscillating relative to each other, whereby the ceramic members will not butt each other, even in the absence of an air gap at their interface. Thus, the assembly of the upper and lower ceramic members of the instant structure is effectively protected against chipping, cracking or other damages at the mating surfaces of the upper and lower ceramic members, and is therefore improved in its operating reliability and durability.

According to one feature of the invention, the adjacent portions of the upper and lower ceramic members have respective shoulder faces which partially define the cutouts and the above-indicated at least one external recess. The shoulder faces face each other with the interface of the ceramic members disposed therebetween, and are held in abutting contact with opposite end faces of the expansion member. The shoulder faces may be formed parallel to the plane of the interface of the two ceramic members. Although the expansion member which keeps the ceramic members in spaced-apart relation during operation of the engine is subject to butting at its end faces against the shoulder faces of the ceramic members, the butting impacts between the ceramic members and the expansion member may be mitigated by elastic deformation of the expansion member if the expansion member is made of a metallic material.

While it is preferred that the expansion member be made of a metallic material for the reason indicated above, the expansion member may be made of a ceramic material such as zirconia which has a larger thermal expansion coefficient than the ceramic materials of the upper and lower ceramic members. In this instance, it is desired that the shoulder faces of the ceramic members and the mating end faces of the expansion member be ground in the same direction, so as to minimize their chipping or cracking due to their mutual butting actions on each other.

According to another feature of the invention, the expansion member is fitted in the corresponding external recess so as to keep the upper and lower ceramic members spaced apart from each other by a predetermined distance even when the engine is at rest, i.e., even when the engine is in a cold state. In this case, an additional amount of air gap is provided at the interface of the two ceramic members when the expansion member thermally expands upon elevation of the temperature of the engine during its operation.

According to a further feature of the invention, the above-indicated at least one external recess consists of a single external recess defined by a pair of cutouts formed in the outer surfaces of the adjacent portions of the two ceramic member, over an entire circumference of the outer surfaces of the two ceramic members.

According to an alternative feature of the invention, the above-indicated at least one external recess consists of a plurality of recesses each of which is constituted by a pair of cutouts aligned with each other at the interface of the two members. In one form of this feature, the plurality of recesses consist of two recesses which are disposed diametrically opposite to each other with respect to the divided combustion chamber.

In another form of the above feature of the invention, the outer surfaces of the upper and lower ceramic members have a substantially circular cross section at the interface, and each of the pair of cutouts is partially defined by a shoulder face formed in the outer surface of the corresponding one of the upper and lower ceramic members. The shoulder face is parallel to the interface and has a segmental shape corresponding to a segment of the circular cross section of the outer surfaces of the ceramic members.

In accordance with a still further feature of the invention, the upper and lower ceramic members are fixed to each other by a metallic ring which is shrink-fitted on the outer surfaces of the upper and lower ceramic members, so as to cover the expansion member fitted in the corresponding external recess.

Although the principle of the present invention is suitably applied to a structure which consists of two ceramic members, namely, the upper and lower ceramic members discussed above, the invention is also applicable to a ceramic assembly of a structure which consists of three or more ceramic members which cooperate to define a divided combustion chamber. In this case, the expansion member may be used for any ceramic sub-assembly which consists of two adjacent ceramic members of the plurality of ceramic members.

Further, it will be understood that the external recess in which the expansion member is fitted or accommodated is not necessarily constituted by two cutouts one of which is formed in one of the first and second (upper and lower) ceramic members, and the other of which is formed in the other of the two ceramic members. In other words, the principle of the present invention may be practiced, provided the ceramic sub-assembly has means for defining at least one external recess which is open at the interface of the two adjacent ceramic members, and provided each external recess is formed to permit the adjacent ceramic members to be moved away from each other by thermal expansion of the expansion member as the temperature of the ceramic sub-assembly (ceramic assembly or structure) of the engine is raised.

Accordingly, the object of the present invention is achieved by the structure which comprises a ceramic assembly which consists of a plurality of ceramic members cooperating with each other to define therein a divided combustion engine, the ceramic assembly having a transfer passage which communicates with the divided combustion chamber and a main combustion chamber of an internal combustion engine, the plurality of ceramic members including a ceramic sub-assembly consisting of a first ceramic member and a second ceramic member which meets with the first ceramic member at an interface thereof to form at least a portion of the divided combustion chamber, characterized in that there is provided at least one expansion member which is formed of a heat resistant material which has a larger coefficient of thermal expansion than the ceramic sub-assembly, namely, than the ceramic materials of the first and second ceramic members, and further characterized in that the ceramic sub-assembly comprises means for defining at least one external recess each of which is open at the interface of the first and second ceramic members. Each external recess accommodates therein the corresponding one of the at least one expansion member, and is formed so as to permit the first and second ceramic members to be moved away from each other by thermal expansion of the expansion member as the temperature of the ceramic sub-assembly is raised due to operation of the engine, whereby a predetermined air gap is kept by the at least one expansion member while the engine is operated at its operating temperature.

BRIEF DESCRIPTION OF THE DRAWINGS

For a better understanding of the principle of the present invention and to show how the same may be carried into effect, reference will now be made, by way of example only, to the accompanying drawings in which:

FIG. 6 is a front elevational view of an assembly of the upper and lower ceramic members in an aligned state;

FIG. 7 is a front perspective view of an expansion member which forms a part of the structure of FIG. 1;

FIG. 8 is a view corresponding to that of FIG. 6, showing the expansion member of FIG. 7 installed in the assembly of the upper and lower ceramic members of FIG. 6;

FIG. 9 is a cross sectional view taken along line 9—9 of FIG. 8;

FIG. 10 is a partly cutaway front elevational view of another embodiment of the structure of the invention defining a divided swirl chamber; and FIG. 11 is a perspective view of an expansion member used in the embodiment of FIG. 10.

DETAILED DESCRIPTION OF PREFERRED EMBODIMENTS

To further clarify the concept of the invention, preferred embodiments of the invention will now be described by reference to the accompanying drawings.

Figure 1:
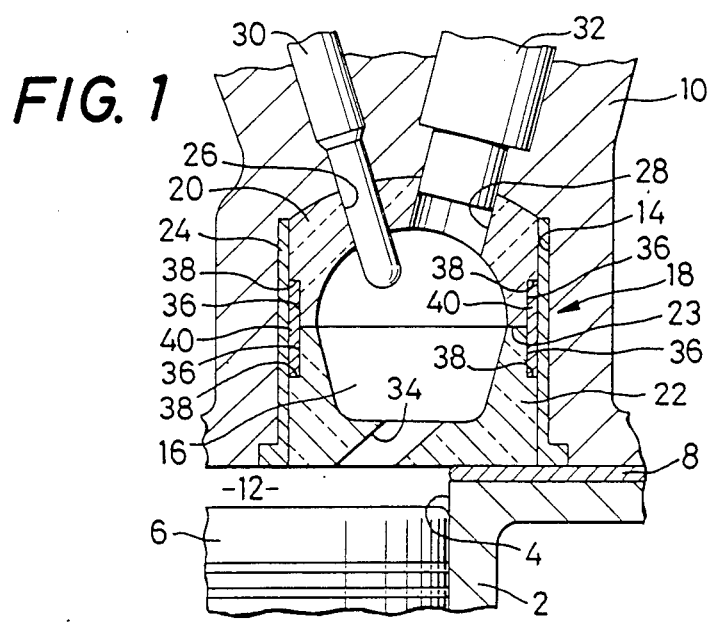
FIG. 1 is a fragmentary view in cross section of a Diesel engine incorporating one embodiment of a structure of the invention defining a divided swirl chamber, which is received in the cylinder head of the engine.

There is shown in FIG. 1 one preferred embodiment of a structure generally indicated at 18. The structure 18 defines a divided combustion chamber in the form of a swirl chamber 16 of a Diesel engine. Described more specifically, reference numeral 2 designates a cylinder body of the Diesel engine which has a cylinder bore 4 formed therein to receive a piston 6. The piston 6 is freely slidably reciprocable within the bore 4 in the vertical direction. On the cylinder body 2, there is mounted via a gasket 8 a cylinder head 10 which covers the opening of the cylinder bore 4. The cylinder head 10 cooperates with the cylinder body 2 to define a main combustion chamber 12. The cylinder head 10 has a recess 14 which partially opens into the main combustion chamber 12. In this recess 14, there is fixedly accommodated the structure 18 defining therein the divided swirl chamber 16 into which a fuel is injected. The structure 18 includes a ceramic assembly which is made of a suitable ceramic material such as silicon nitride, silicon carbide, zirconia, alumina, glass ceramics or mullite.

As indicated in FIG. 1, the ceramic assembly of the structure 18 consists of two separate ceramic members, that is, a first or upper ceramic member 20 and a second or lower ceramic member 22 which are assembled as a unitary body and fixed together by a metallic ring 24 received in the recess 14. The metallic ring 24, which is a part of the structure 18, is shrink-fitted on the outer surfaces of the upper and lower ceramic members 20, 22. Described in greater detail referring further to FIGS. 2-5, the upper and lower ceramic member 20, 22 have cylindrical outer surfaces which have the same diameter. The upper ceramic member 20 is open at one of its longitudinal ends and closed at the other end by a partial substantially spherical bottom wall in contact with the bottom or closed end of the recess 14. Similarly, the lower ceramic member 22 is open at one of its longitudinal ends. The two ceramic members 20, 22 are assembled such that their open end faces are held in abutting contact with each other at an interface 23, so as to form therein the swirl chamber 16. In this condition, the two ceramic members 20, 22 are retained by the metallic ring 24 which is tightly fitted on the outer surfaces of the ceramic assembly by means of a shrinkage fit. The metallic ring 24 and the ceramic assembly 20, 22 are fixedly received in the recess 24 in the cylinder head 10.

Figure 3:
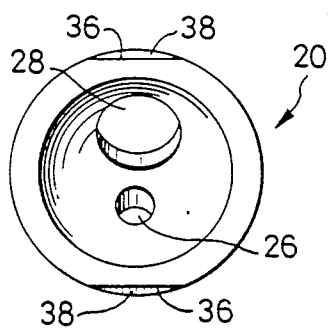

As shown in FIG. 1, the partial spherical bottom wall of the upper ceramic member 20 is convexed toward the bottom of the recess 14, so that the partial spherical bottom wall forms the top portion of the swirl chamber 16. As indicated in FIG. 3, the bottom wall of the upper ceramic member 20 has two holes 26, 28 formed therethrough. With the ceramic assembly 20, 22 received in the recess 14, a glow plug 30 is inserted through the hole 26 into the swirl chamber 16, while a fuel injection nozzle 32 is inserted in the hole 28, as shown in FIG. 1.

Figure 5:
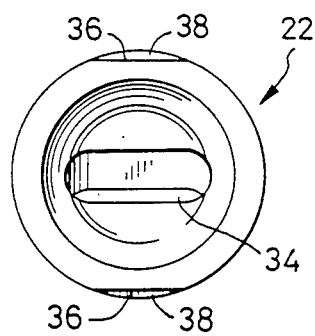

The closed end or bottom wall of the lower ceramic member 22 has a transfer passage 34 as shown in FIGS. 1 and 5. The transfer passage 34 communicates with the main combustion chamber 12, as depicted in FIG. 1, whereby the divided swirl chamber 16 communicates with the main combustion chamber 12 through the passage 34. Jets of fuel are injected into the swirl chamber 16 from the injection nozzle 32 inserted in the injection hole 28 in the upper ceramic member 20. The injected fuel is burned in the swirl chamber 16 so that the resultant swirl is introduced through the passage 34 into the main combustion chamber 12.

Figure 2:
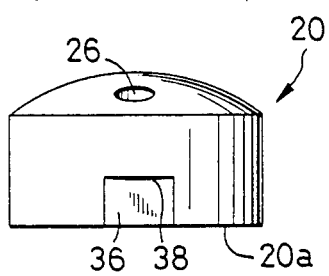
FIGS. 2 and 3 are a front elevational view and a bottom plan view of an upper ceramic member of the structure of FIG. 1, respectively.
Figure 4:
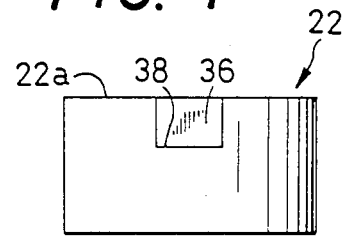
FIGS. 4 and 5 are a front elevational and a top plan view of a lower ceramic member of the same structure, respectively.

As illustrated in FIGS. 2-5, each of the adjacent portions of the upper and lower ceramic members 20, 22 adjacent to the interface 23 has two cutouts 36 in the outer surface. These two cutouts 36 in each ceramic member 20, 22 are disposed opposite to each other diametrically of the swirl chamber 16 or of the ceramic members 20, 22 at its interface 23, as indicated in FIGS. 3 and 5. Each cutout 36 is open at the end face 20a or 22a of the ceramic member 20, 22, as shown in FIGS. 2 and 4. The cutout 36 has a rectangular shape in the elevational views of the upper and lower ceramic members 20, 22 as indicated in FIGS. 2 and 4, and an arcuate or segmental shape in the plan views of the ceramic members 20, 22 as indicated in FIGS. 3 and 5. Stated more particularly, with the ceramic members 20, 22 assembled in predetermined circumferential or angular relation with each other, each cutout 36 formed in the upper ceramic member 20 is alinged with the corresponding cutout 36 formed in the lower ceramic member 22, such that these two aligned cutouts 36 cooperate to constitute an external recess 37 of a rectangular shape as indicated in FIG. 6. Each recess 37 extends across the interface 23 so as to bridge the adjacent portions of the two ceramic members 20, 22. The dimension of the recess 37 perpendicular to the interface 23 is determined by two opposite shoulder faces 38, 38 which are formed parallel to the interface 23, in the outer surfaces of the two ceramic members 20, 22, respectively, so as to partially define the previously indicated cutouts 36. As clearly shown in the plan views of FIGS. 3 and 5, each shoulder face 38 has a segmental shape which corresponds to a segment of the outer circumference (circular transverse cross sectional shape) of the ceramic members 20, 22. The length of the chord of the segment is equal to the dimension of the recess 37 as measured parallel to the interface 23.

An expansion member 40 shown in FIG. 7 is fitted or accommodated in each of the two recesses 37 which are opposite to each other in the diametrical direction of the ceramic assembly 20, 22. Each expansion member 40 has a segmental transverse cross sectional shape identical with the shape of the shoulder faces 38 (as seen in FIGS. 3 and 5), so that arcuate outer surfaces 41 of the expansion members 40 accommodated in the two recesses 37 (as indicated in FIG. 8) cooperates with the outer surfaces of the ceramic members 20, 22 to form an outer circumferential surface which fits the inner circumferential surface of the metallic ring 24, as indicated in FIG. 1. The expansion members 40 are made of a suitable metallic material which has a larger coefficient of thermal expansion that the ceramic material of the ceramic members 20, 22. As previously described, the metallic ring 24 is shrink-fitted on the outer surface of the ceramic assembly 20, 22, with the expansion members 40, 40 received in the corresponding recesses 37, 37 (only one of the two recesses 37 shown in FIGS. 6 and 8).

In the instant embodiment, the two expansion members 40 and the corresponding recesses 37 are dimensioned so that there exist no clearances between the shoulder faces 38 and the opposite end faces 42 of the expansion member 40, and no clearance between the mating end faces 20a, 22a (FIGS. 2 and 4) of the upper and lower ceramic members 20, 22, while the Diesel engine is at rest, i.e., while the structure 18 or the ceramic assembly 20, 22 is in a cold state or at the normal or ambient temperature. The expansion members 40 may be made of any metallic materials which have sufficient degrees of heat resistance and rigidity and a larger coefficient of thermal expansion than the ceramic material of the ceramic members 20, 22, over the range of temperature variation of the structure 18.

According to the present embodiment of the structure 18 which comprises the upper and lower ceramic members 20, 22, expansion members 40 and metallic ring 24, the ceramic members 20, 22 are tightly clamped together as a unitary ceramic assembly with a comparatively large force produced by a shrinkage fit of the external metallic ring 24 on the assembly 20, 22 while the Diesel engine is in a non-operating condition, i.e., in a cold state. As the temperature of the structure 18 rises after the start of the engine with jets of fuel being injected into the swirl chamber 16 through the injection nozzle 32, the metallic ring 24 thermally expands to a greater extent than the ceramic members 20, 22, whereby the retention force of the metallic ring 24 for holding the ceramic members 20, 22 is reduced, allowing the ceramic members 20, 22 to be oscillated relative to each other, due to the explosion of the fuel and the vibration of the engine.

At the same time, however, the rise in the temperature of the structure 18 after the start of the engine causes thermal expansion of the expansion members 40 held in abutting contact with the shoulder faces 38 of the recesses 37 (cutouts 36), to a greater extent than the ceramic members 20, 22. As a result, a small air gap or clearance is created between the mating end faces 20a and 22a of the upper and lower ceramic members 20, 22. With this air gap, the two ceramic members 20, 22 will not hit or butt each other at their interface 23, even if the ceramic members 20, 22 have oscillating movements relative to each other during the operation of the engine. While the engine is still cold, i.e., for a short time after its start, there exists substantially no or only a small clearance or air gap at the interface 23 of the ceramic members 20, 22. Since the retention force of the metallic ring 24 is still sufficient in this period, the upper and lower ceramic members 20, 22 are not allowed to have oscillating movements relative to each other, and are thus effectively protected from their mutually butting actions.

While the engine is operated with the divided swirl chamber 18 held at an elevated temperature, the upper and lower ceramic members 20, 22 are kept in slightly spaced-apart relation with each other, with the expansion members 40 being held in abutting contact with the corresponding shoulder faces 38 of the cutouts 36, as previously discussed. In this condition, the end faces 42 of the expansion members 40 and the shoulder faces 38 may suffer mutually butting or hitting actions due to the explosion of the fuel and the vibrating movements of the engine. However, the impacts given to the end faces 42 and the shoulder faces 38 may be considerably absorbed by means of elastic deformation of the metallic material of the expansion members 40, whereby the resulting chipping or cracking of the shoulder faces 38 of the ceramic members 20, 22 are effectively prevented.

As described above, the structure 18 constructed according to the present embodiment of the invention is provided with means for effectively protecting the ceramic members 20, 22 against chipping or cracking, and is thus significantly improved in the operating reliability.

In the present embodiment, each expansion member 40 having a segmental cross sectional shape is fitted in the corresponding recess 37 of the same cross sectional shape which is constituted by the two cutouts 36, 36 formed in the adjacent portions of the two ceramic members 20, 22, respectively. This arrangement provides an advantage that the expansion members 40 and the recesses 37 cooperate to establish a predetermined circumferential or angular position of the two ceramic members 20, 22 relative to each other. In other words, the expansion members 40 fitted in the corresponding pairs of the opposed cutouts 36, 36 also function as means for preventing the two ceramic members 20, 22 from rotating relative to each other. Hence, there is no need to provide or form the ceramic members 20, 22 with exclusive means for their relative circumferential positioning.

A further advantage is offered by the present embodiment wherein the structure 18 defining the divided swirl chamber 16 includes the expansion members 40 which are different in the material from the ceramic members 20, 22. Namely, the temperature distribution of the structure 18 can be controlled to some extent, by suitably selecting the number, location and dimensions of the expansion members 40 (and therefore of the cutouts 36 or recesses 37 as well), and the material of the expansion members 40.

Referring next to FIGS. 10 and 11, there is illustrated another embodiment of the present invention, in which each of upper and lower ceramic members 44, 46 similar to the ceramic members 20, 22 has an annular cutout 48 formed in its outer circumferential surface, adjacent and parallel to the end face. The annular cutouts 48, 48 formed in the adjacent portions of the two ceramic members 44, 46 have the same depth and width, so that the two annular cutouts 48, 48 cooperte to form an external annular recess 49 if the two ceramc members 44, 46 are assembled with their end faces abtting on each other. In the present modified embodiment, owever, the end faces of the two ceramic members 44, 46 ae spaced apart from each other by a predetermined small dstance, even while the engine is cold. Stated more specifcally, the annular cutouts 48, 48 are adapted to receive a single expansion member in the form of a metallic ring 50 shown in FIG. 11. This ring 50 has a wall thickness equal to the depth of the cutouts 48, 48, and an axial length or height which is slightly larger than a sum of the widths of the two cutouts 48, 48, at the normal or ambient temperature. Thus, a predetermined small clearance or air gap is maintained at the interface of the upper and lower ceramic members 44, 46, as indicated at 51 in FIG. 10, even when the engine is cold. The expansion ring 50 is made of a metallic material which has a larger coefficient of thermal expansion than the material of the ceramic members 44, 46. The upper and lower ceramic members 44, 46 with the expansion ring 50 fitted in the annular recess 49 (cutouts 48, 48) are tightly fixed together with the metallic ring 24, which is shrink-fitted on the outer surface of the ceramic assembly 44, 46, in the same manner as in the preceding embodiment. Thus, a structure 52 is provided to define a divided combustion chamer.

The structure 52 of the present modified embodiment also has high operating reliability, with its ceramic members 44, 46 effectively protected against chipping or cracking. Reference numeral 54 in FIG. 10 indicates annular shoulder faces which partially define the annular cutouts 48, 48 (recess 49) and which are held in contact with the opposite end faces 53, 53 of the expansion ring 50.

While the present invention has been described in its preferred embodiments for illustrative purpose only, it is to be understood that the invention is by no means confined to the illustrated details.

Although the structure 18 of the first embodiment is adapted such that the upper and lower ceramic members 20, 22 are held in abutting contact with each other at their end faces 20a, 22a without a clearance therebetween when the structure 18 is at the normal or ambient temperature, it is possible to maintain a predetermined clearance between the end faces 20a, 22a of the two ceramic members 20, 22, as in the structure 52 of the second embodiment. Conversely, it is possible that the two ceramic members 44, 46 of the second embodiment are held in abutting contact with each other without a clerance between their end faces while the structure 52 is in a cold state.

While the expansion members 40, 50 used in the illustrated embodiments are made of a metallic material, it is possible to form these expansion members of a suitable ceramic material which has a larger coefficient of thermal expansion than the ceramic material of the ceramic members 20, 22, 44, 46. For example, the expansion members 40, 50 may be made of zirconia, where the ceramic members 20, 22, 44, 46 are made of silicon nitride or other ceramics whose thermal expansion coefficient is smaller than that of zirconia. In this connection, it is noted that the coefficients of thermal expansion of silicon nitride and zirconia over the temperature range of 40°–1000° C. are $3.3 \times 10^{-6}/°C.$, and $10.5 \times 10^{6}/°C.$, respectively. In this case, too, the principle of the invention may be practiced in the same manner as in the illustrated embodiments. Where a ceramic material is used for the expansion members, it is required that the opposite end faces (42, 53) of the expansion members (40, 50) and the corresponding shoulder faces (38, 54) of the external recess or recesses (37, 49) be ground or otherwise processed in the same direction, so that the direction of the processing marks left on the shoulder faces matches that of the marks left on the end faces of the expansion members, in order to minimize the chipping or cracking of the ceramic materials.

While the ceramic assembly of the illustrated structure 18, 52 consists of two ceramic members, that is, upper and lower ceramic members (20, 22; 44, 48) the principle of the invention is applicable to other types of the structure defining a divided chamber. For instance, the structure according to the invention may consist of three or more ceramic members superposed on each other or otherwise arranged relative to each other, so as to form therein a divided combustion chamber. In other words, the present invention is applicable to any ceramic sub-assembly which consists of two adjacent ceramic members of a ceramic assembly which consists of three or more ceramic members. Further, the top ceramic member, for example, may have a vertical cut or cuts, which divide the top member into two or more sections.

In the illustrated embodiments, each of the external recesses 37 and annular recess 49 is constituted by a pair of cutouts 36, 36, or 48, 48 which are formed in the adjacent portions of the two ceramic members 20, 22 or 44, 46, respectively. It will be understood, however, that an external recess in which an expansion member is fitted according to the invention is not necessarily constituted by such a pair of cutouts, but may be constituted by a single cutout which is formed in one of the two adjacent ceramic members, provided the single cutout is open at the end face of the ceramic member. In this case, the expansion member abuts at one of its ends on the shoulder face of the cutout in one of the two ceramic members, and at the other end on the end face the other ceramic member.

Although the metallic ring 24 is fitted on the outer surface of the ceramic assembly 20, 22 of the structure 18, or ceramic assembly 44, 46 of the structure 52, to retain the ceramic assembly therein, it is possible that the ceramic assembly is directly held in the inner surface of the cylinder head 10 defining the recess 14.

While the foregoing description is associated with a structure defining a divided combustion chamber in the form of a swirl chamber of a Diesel engine, which is formed by a plurality of ceramic members, it will be obvious that the concept of the present invention is equally applicable to a structure defining divided combustion chamber of other types, such as a pre-cumbustion chamber or air chamber.

Although the present invention is suitably applied to a structure defining a divided combustion chamber of a Diesel engine, the invention is also suitably applicable to a similar structure for other types of internal combustion engines, provided that structure includes a ceramic assembly which consists of a plurality of ceramic members.

It will be understood that the present invention may be embodied with various other changes, modifications and improvements, which may occur without departing the spirit of the present invention.

What is claimed is:

1. A structure defining a divided combustion chamber of an internal combustion engine, comprising an upper ceramic member, and a lower ceramic member having a transfer passage which communicates with a main combustion chamber of the engine, said upper and lower ceramic members meeting with each other at an interface to form therein said divided combustion chamber such that the divided combustion chamber communicates with said main combustion chamber through said transfer passage, wherein the improvement comprises:

said upper and lower ceramic members having cutouts formed respectively in outer surfaces thereof, said cutouts cooperating to constitute at least one external recess which extends across said interface so as to bridge adjacent portions of said upper and lower ceramic members;

an expansion member fitted in each of said at least one external recess, and formed of a heat resistant material which has a larger coefficient of thermal expansion than said upper and lower ceramic members, said expansion member thermally expanding relative to said upper and lower ceramic members at an operating temperature of said engine, and thereby keeping said upper and lower ceramic members in spaced-apart relation with each other, with a predetermined amount of air gap at said interface during an operation of said engine.

2. A structure according to claim 1, wherein said adjacent portions of said upper and lower ceramic members have respective shoulder faces which partially define said cutouts and said at least one external recess, said shoulder faces facing each other with said interface disposed therebetween, and abutting on opposite end faces of said expansion member.

3. A structure according to claim 2, wherein said shoulder faces are parallel to said interface.

4. A structure according to claim 1, wherein said at least one external recess consists of a single external recess defined by a pair of cutouts formed in the outer surfaces of said adjacent portions of said upper and lower ceramic members, over an entire circumference of said outer surfaces.

5. A structure according to claim 1, wherein said at least one external recess consists of a plurality of recesses each of which is constituted by a pair of cutouts aligned with each other at said interface.

6. A structure according to claim 5, wherein said plurality of recesses consist of two recesses which are disposed diametrically opposite to each other with respect to said divided combustion chamber.

7. A structure according to claim 5, wherein said outer surfaces of said upper and lower ceramic members having a substantially circular cross section at said interface, each of said pair of cutouts is partially defined by a shoulder face formed in the outer surface of the corresponding one of said upper and lower ceramic members, said shoulder face being parallel to said interface and having a segmental shape corresponding to a segment of said circular cross section.

8. A structure according to claim 1, wherein said expansion member is made of a metallic material.

9. A structure according to claim 1, wherein said expansion member is made of a ceramic material.

10. A structure according to claim 1, wherein said expansion member is made of a ceramic material, said shoulder faces of said upper and lower ceramic members and said opposite end faces of said expansion member being ground in the same direction.

11. A structure according to claim 9, wherein said expansion member is made of zirconia.

12. A structure according to claim 1, wherein said upper and lower ceramic members are fixed to each other by a metallic ring which is shrink-fitted on outer surfaces of said upper and lower ceramic members, so as to cover said expansion member fitted in said at least one external recess.

13. A structure according to claim 1, wherein said expansion member keeps said upper and lower ceramic members spaced apart from each other by a predetermined distance even when said engine is in a cold state.

14. A structure defining a divided combustion chamber of an internal combustion engine, comprising a ceramic assembly which consists of a plurality of ceramic members cooperating with each other to define therein said divided combustion chamber, said ceramic assembly having a transfer passage which communicates with said divided combustion chamber and a main combustion chamber of the engine, said plurality of ceramic members including a ceramic sub-assembly consisting of a first ceramic member and a second ceramic member which meets with said first ceramic member at an interface thereof to form at least a portion of said divided combustion chamber, wherein the improvement comprises:

at least one expansion member formed of a heat resistant material which has a larger coefficient of thermal expansion than said ceramic sub-assembly; and means for defining a least one external recess in said ceramic sub-assembly, each of said at least one external recess being open at said interface and accommodating therein the corresponding one of said at least one expansion member, said each external recess being formed to permit said first and second ceramic members to be moved away from each other by thermal expansion of said each expansion member as a temperature of said ceramic sub-assembly is raised, whereby a predetermined air gap is kept by said at least one expansion member during an operation of said engine at an operating temperature thereof.

15. A structure according to claim 14, wherein said at least one external recess consists of a plurality of external recesses each of which is constituted by a pair of cutouts, one of said pair of cutouts being formed in one of adjacent portions of said first and second ceramic members, while the other cutout being formed in the other of said adjacent portions, said pair of cutouts being aligned with each other with said interface disposed therebetween.

16. A structure according to claim 14, wherein said at least one external recess consists of a single external recess constituted by a pair of annular cutouts which are formed in adjacent portions of said first and second ceramic members, respectively, said at least one expansion member consisting of a single ring fitted in said single external recess.

17. A structure according to claim 14, wherein said ceramic sub-assembly has a circular cross section at said interface, and said at least one expansion member comprises an expansion member which has a segmental transverse cross sectional shape corresponding to a segment of said circular cross section of said ceramic sub-assembly.

18. A structure according to claim 14, wherein said first and second ceramic members are held in abutting contact with each other at said interface when said ceramic-sub assembly is in a cold state.

19. A structure according to claim 14, wherein said at least one expansion member keeps said first and second ceramic members spaced apart from each other by a predetermined distance even when said ceramic sub-assembly is in a cold state.

20. A structure according to claim 14, further comprising a metallic ring which is shrink-fitted on the outer surface of said ceramic sub-assembly so as to retain said first and second ceramic members.

21. A structure according to claim 14, wherein said ceramic assembly consists of said first and second ceramic members one of which has said transfer passage communicating with said main combustion chamber.

* * * * *